US009832189B2

United States Patent
Han et al.

(10) Patent No.: US 9,832,189 B2
(45) Date of Patent: Nov. 28, 2017

(54) AUTOMATIC ASSOCIATION OF AUTHENTICATION CREDENTIALS WITH BIOMETRICS

(71) Applicant: Apple Inc., Cupertino, CA (US)

(72) Inventors: Byron B. Han, Cupertino, CA (US); Craig A. Marciniak, San Jose, CA (US); John A. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 13/802,499

(22) Filed: Mar. 13, 2013

(65) Prior Publication Data

US 2014/0007185 A1   Jan. 2, 2014

Related U.S. Application Data

(60) Provisional application No. 61/666,755, filed on Jun. 29, 2012.

(51) Int. Cl.
    *H04L 29/06* (2006.01)
    *G06F 21/32* (2013.01)
    *G06F 21/62* (2013.01)

(52) U.S. Cl.
    CPC .......... *H04L 63/0861* (2013.01); *G06F 21/32* (2013.01); *G06F 21/62* (2013.01)

(58) Field of Classification Search
    CPC .......... G06F 21/32; G06F 21/44; G06F 21/62; H04L 63/0861
    (Continued)

(56) References Cited

U.S. PATENT DOCUMENTS 5,872,834 A   2/1999 Teitelbaum
6,256,737 B1 * 7/2001 Bianco et al. ................ 713/186
(Continued)

FOREIGN PATENT DOCUMENTS

CN   1268234   9/2000
CN   1695163   11/2005
(Continued)

OTHER PUBLICATIONS

U.S. Appl. No. 13/798,000, filed Mar. 12, 2013, Han et al.
(Continued)

*Primary Examiner* — Hosuk Song
*Assistant Examiner* — J. Brant Murphy
(74) *Attorney, Agent, or Firm* — Brownstein Hyatt Farber Schreck, LLP

(57) ABSTRACT

A computing device may receive authentication information. Within a time-out period, a fingerprint may also be received. The computing device may assign one or more authentication credentials to the fingerprint based on authentication credentials associated with the received authentication information. In some implementations, the computing device may assign the authentication credentials associated with the received authentication information to the biometric. However, in other implementations, the computing device may assign different authentication credentials to the biometric based on one or more user preferences, defaults, security policies, and/or enterprise policies. In various implementations, the authentication credentials assigned to the biometric may be altered, such as by adding and/or removing one or more authentication credentials. Such alteration may be performed in response to a received user request, changed enterprise policy, changed security policy, fraud alert, and/or other such factor.

20 Claims, 3 Drawing Sheets

(58) Field of Classification Search
USPC .......................................................... 726/1
See application file for complete search history.

(56) References Cited

U.S. PATENT DOCUMENTS

| | | |
|---|---|---|
| 6,795,569 B1 | 9/2004 | Setlak |
| 6,845,453 B2 | 1/2005 | Scheidt et al. |
| 6,892,938 B2 | 5/2005 | Solomon |
| 6,975,202 B1 | 12/2005 | Rodriguez et al. |
| 7,046,139 B2 | 5/2006 | Kuhn et al. |
| 7,065,184 B2 | 6/2006 | Vishik et al. |
| 7,110,987 B2 | 9/2006 | Engelhart |
| 7,210,620 B2 | 5/2007 | Jones |
| 7,246,244 B2 | 7/2007 | Nanavati et al. |
| 7,269,737 B2 | 9/2007 | Robinson |
| 7,278,025 B2 | 10/2007 | Saito et al. |
| 7,502,761 B2 | 3/2009 | Siegal et al. |
| 7,769,845 B2 | 8/2010 | Baron |
| 7,809,954 B2 | 10/2010 | Miller et al. |
| 7,849,013 B2 | 12/2010 | Engelhart |
| 7,864,987 B2 | 1/2011 | Venkatanna et al. |
| 7,865,439 B2 | 1/2011 | Siefert et al. |
| 7,941,664 B2 | 5/2011 | Wheeler |
| 7,953,671 B2 | 5/2011 | Bishop et al. |
| 7,980,378 B2 | 7/2011 | Jones et al. |
| 8,028,896 B2 | 10/2011 | Carter et al. |
| 8,063,889 B2 * | 11/2011 | Anderson ............ G06F 3/04886 345/172 |
| 8,064,658 B2 | 11/2011 | Iannone |
| 8,145,916 B2 | 3/2012 | Boshra et al. |
| 8,171,531 B2 | 5/2012 | Buer |
| 8,185,646 B2 | 5/2012 | Headley |
| 8,190,908 B2 | 5/2012 | Jazayeri et al. |
| 8,230,232 B2 | 7/2012 | Ahmed et al. |
| 8,060,413 B2 | 11/2012 | Castell et al. |
| 8,320,638 B2 | 11/2012 | Pitt et al. |
| 8,345,931 B2 | 1/2013 | Jeronimus |
| 8,369,845 B2 | 2/2013 | Zou et al. |
| 8,406,736 B2 | 3/2013 | Das et al. |
| 8,429,760 B2 | 4/2013 | Tribble |
| 8,566,955 B2 | 10/2013 | Brosnan |
| 8,572,707 B2 | 10/2013 | Tuchman et al. |
| 8,621,561 B2 | 12/2013 | Cross et al. |
| 8,627,417 B2 * | 1/2014 | Aoyama ............................ 726/5 |
| 8,627,454 B2 | 1/2014 | Bolyukh |
| 8,635,165 B2 | 1/2014 | Beenau |
| 8,660,322 B2 | 2/2014 | Tsai et al. |
| 8,682,798 B2 | 3/2014 | Patterson |
| 8,762,276 B2 | 6/2014 | Lepisto et al. |
| 8,799,670 B2 | 8/2014 | Naccache |
| 8,839,371 B2 | 9/2014 | Ghosh |
| 8,905,303 B1 | 12/2014 | Ben Ayed |
| 8,943,326 B2 | 1/2015 | Tamkhane et al. |
| 9,203,845 B2 | 12/2015 | Webber |
| 9,208,337 B2 | 12/2015 | Tayloe |
| 9,271,086 B2 | 2/2016 | Kim et al. |
| 2001/0036299 A1 * | 11/2001 | Senior ............................ 382/124 |
| 2002/0018585 A1 | 2/2002 | Kim |
| 2002/0056043 A1 | 5/2002 | Glass |
| 2002/0073416 A1 | 6/2002 | Ramsey Catan |
| 2002/0095586 A1 * | 7/2002 | Doyle ................ G06F 21/32 713/186 |
| 2002/0174345 A1 | 11/2002 | Patel |
| 2002/0188574 A1 | 12/2002 | Niwa |
| 2003/0040339 A1 | 2/2003 | Chang |
| 2003/0046237 A1 | 3/2003 | Uberti |
| 2003/0156740 A1 | 8/2003 | Siegel et al. |
| 2004/0044627 A1 | 3/2004 | Russell et al. |
| 2004/0187009 A1 * | 9/2004 | Ebata ............................ 713/185 |
| 2005/0116026 A1 * | 6/2005 | Burger et al. ............ 235/380 |
| 2005/0154920 A1 * | 7/2005 | Tartaglia et al. ......... 713/201 |
| 2005/0229006 A1 | 10/2005 | deMoura et al. |
| 2006/0173793 A1 | 8/2006 | Glass |
| 2006/0204048 A1 | 9/2006 | Morrison et al. |
| 2006/0234764 A1 | 10/2006 | Gamo et al. |
| 2007/0267478 A1 | 11/2007 | Turek et al. |
| 2008/0016371 A1 | 1/2008 | Jiang et al. |
| 2008/0097925 A1 | 4/2008 | King |
| 2008/0103984 A1 | 5/2008 | Choe et al. |
| 2008/0109871 A1 * | 5/2008 | Jacobs ............................ 726/1 |
| 2008/0195506 A1 | 8/2008 | Koretz et al. |
| 2009/0083850 A1 | 3/2009 | Fadell et al. |
| 2009/0224874 A1 | 9/2009 | Dewar et al. |
| 2009/0240622 A1 | 9/2009 | Zandonadi |
| 2009/0320125 A1 * | 12/2009 | Pleasant et al. ................ 726/17 |
| 2010/0005509 A1 | 1/2010 | Peckover |
| 2010/0096710 A1 * | 4/2010 | Chou ............................ 257/414 |
| 2010/0218012 A1 | 8/2010 | Joseph et al. |
| 2010/0225607 A1 * | 9/2010 | Kim ................................ 345/173 |
| 2010/0241571 A1 | 9/2010 | McDonald |
| 2010/0321197 A1 * | 12/2010 | Wong et al. ................ 340/691.3 |
| 2011/0082791 A1 | 4/2011 | Baghdasaryan et al. |
| 2011/0119479 A1 | 5/2011 | Cowie et al. |
| 2011/0138450 A1 | 6/2011 | Kesanupalli et al. |
| 2011/0166922 A1 | 7/2011 | Fuerstenberg |
| 2011/0238455 A1 | 9/2011 | Carr et al. |
| 2011/0246766 A1 | 10/2011 | Orsini et al. |
| 2011/0291798 A1 * | 12/2011 | Schibuk ....................... 340/5.61 |
| 2011/0300829 A1 | 12/2011 | Nurmi et al. |
| 2012/0110662 A1 | 5/2012 | Brosnan |
| 2012/0123841 A1 | 5/2012 | Taveau et al. |
| 2012/0237908 A1 | 9/2012 | Fitzgerald et al. |
| 2012/0262399 A1 | 10/2012 | Colley et al. |
| 2012/0290376 A1 | 11/2012 | Dryer et al. |
| 2012/0317691 A1 | 12/2012 | Kawana et al. |
| 2012/0330769 A1 | 12/2012 | Arceo |
| 2013/0067545 A1 | 3/2013 | Hanes |
| 2013/0081119 A1 * | 3/2013 | Sampas ............................ 726/7 |
| 2013/0124416 A1 | 5/2013 | Pawar et al. |
| 2013/0159699 A1 | 6/2013 | Torkkel |
| 2013/0188927 A1 | 7/2013 | Seryakov et al. |
| 2013/0254906 A1 | 9/2013 | Kessler et al. |
| 2013/0298224 A1 | 11/2013 | Heilpern |
| 2014/0006795 A1 | 1/2014 | Han et al. |
| 2014/0007185 A1 | 1/2014 | Han et al. |
| 2014/0189807 A1 | 7/2014 | Cahill et al. |
| 2014/0279516 A1 | 9/2014 | Rellas et al. |
| 2015/0073998 A1 | 3/2015 | Alsina et al. |
| 2015/0074796 A1 | 3/2015 | Meir et al. |
| 2015/0081552 A1 | 3/2015 | Stewart |
| 2015/0116086 A1 | 4/2015 | Kim et al. |
| 2015/0186892 A1 | 7/2015 | Zhang et al. |
| 2015/0199687 A1 | 7/2015 | Han et al. |
| 2015/0220931 A1 | 8/2015 | Alsina et al. |
| 2015/0294382 A1 | 10/2015 | Alsina et al. |
| 2015/0304323 A1 | 10/2015 | Alsina et al. |
| 2016/0182508 A1 | 6/2016 | Gresham et al. |
| 2016/0248769 A1 | 8/2016 | Han et al. |

FOREIGN PATENT DOCUMENTS

| | | | |
|---|---|---|---|
| CN | 1783052 | | 6/2006 |
| CN | 1983336 | | 6/2007 |
| CN | 101933051 | | 12/2010 |
| CN | 102088353 | | 6/2011 |
| CN | 103037065 | | 4/2013 |
| CN | 103221958 | | 7/2013 |
| CN | 103268550 | | 8/2013 |
| CN | 103295129 | | 9/2013 |
| DE | 202005003042 | | 11/2006 |
| DE | 102009027682 | | 1/2011 |
| DE | 102012202731 | | 8/2013 |
| EP | 1857954 | | 11/2007 |
| EP | 2226741 | | 9/2010 |
| EP | 2114051 | | 6/2012 |
| EP | 2533172 | A1 | 12/2012 |
| EP | 2597585 | | 5/2013 |
| GB | 2447752 | * | 9/2008 |
| JP | 2010140174 | | 6/2010 |
| JP | 2011192288 | | 9/2011 |
| KR | 1020120122181 | | 11/2012 |
| TW | I236634 | | 7/2005 |
| TW | 200901724 | | 1/2009 |
| TW | 200919255 | | 5/2009 |

(56) References Cited

FOREIGN PATENT DOCUMENTS

| | | |
|---|---|---|
| TW | 201319817 | 5/2013 |
| WO | WO 03/062969 | 7/2003 |
| WO | WO 2008/004312 | 1/2008 |
| WO | WO 2008/030184 | 3/2008 |
| WO | WO 2013/095434 | 6/2013 |

OTHER PUBLICATIONS

U.S. Appl. No. 13/802,558, filed Mar. 13, 2013, Han et al.
U.S. Appl. No. 14/022,104, filed Sep. 9, 2013, Alsina et al.
U.S. Appl. No. 14/170,360, filed Jan. 31, 2014, Alsina et al.
International Search Report and Written Opinion dated Oct. 21, 2013, PCT/US2013/047683, 14 pages.
Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.
U.S. Appl. No. 15/480,178, filed Apr. 5, 2017, Han et al.

\* cited by examiner

AUTOMATIC ASSOCIATION OF AUTHENTICATION CREDENTIALS WITH BIOMETRICS

CROSS-REFERENCE TO RELATED APPLICATION

The present application claims the benefit under 35 U.S.C. §119(e) to U.S. Provisional Patent Application No. 61/666,755, which was filed on Jun. 29, 2012, and entitled "Automatic Association of Authentication Credentials with Biometrics," which is incorporated by reference as if fully disclosed herein.

FIELD OF THE INVENTION

This disclosure relates generally to authentication, and more specifically to automatic association of authentication credentials with biometrics.

BACKGROUND

Computing devices (such as smart phones, laptop computers, desktop computers, server computers, mobile computers, tablet computers, digital music players, digital video players, and other such computing devices) may be capable of performing a variety of functions. Such functions may include executing applications such as web browsers, productivity software, games, playing media (such as images, audio, video, music, and other such media), electronic mail clients, and/or any other software application. In some cases, such functions may be performed in response to one or more instructions received from one or more users via one or more input/output devices.

In some cases, such computing devices may require that a user provide authentication information before access to one of more functions is granted. Such authentication information may include one or more passwords, one or more pin (personal identification number) codes, one or more biometrics (such as one or more fingerprints, handprints, toe prints, footprints, retinal images, iris images, and/or other such biometrics), one or more security certificates, and/or any other information and/or materials that may be utilized to authenticate users. In such cases, computing devices may receive such authentication information, determine whether or not the authentication information allows the user to access the function for which the authentication information was provided, and perform one or more actions accordingly.

However, configuring computing devices to utilize biometrics, such as fingerprints, as authentication information may be a burdensome process for users. Often, users may have to participate in one or more "enrollment" processes where users provide fingerprints (such as via one or more touch I/O devices associated with the respective computing device) and specify the authentication credentials (i.e., user rights) that are to be associated with the fingerprint. Particularly in cases where the user has already configured other authentication information (such as one or more passwords or pin codes), users may perceive such an enrollment process to be tedious, redundant, and time consuming.

SUMMARY

The present disclosure discloses systems and methods for automatic association of authentication credentials with biometrics. A computing device may receive authentication information from a user. Such authentication information may include one or more passwords, one or more pin codes, and/or other such authentication information. Within a time-out period (such as a few seconds as part of a unified gesture/action gather and validate a biometric) from receipt of the authentication information, the computing device may receive one or more biometrics from the user. Such biometrics may include one or more fingerprints, retinal images, and/or other such biometrics. The computing device may assign one or more authentication credentials to the one or more biometrics. The assigned authentication credentials may based at least on the authentication credentials associated with previously received authentication information. In this way, authentication credentials may be automatically associated with user biometrics without requiring users to participate in any potentially burdensome enrollment processes.

In some implementations, the computing device may assign the authentication credentials associated with the received authentication information to the biometric. However, in other implementations, the computing device may assign different authentication credentials to the biometric, such as a subset of the authentication credentials associated with the received authentication information or a superset of the authentication credentials associated with the received authentication information. Such assignment of different authentication credentials may be determined based on one or more user preferences, defaults, security policies, enterprise policies, and so on.

In various implementations, the authentication credentials assigned to the biometric may be altered. In some cases, user rights associated with the authentication credentials may be removed and/or added. Such alteration may be performed in response to received user requests, changed enterprise policies pushed to the computing device, changed security policies, fraud alerts associated with the user and/or the computing device, and/or other such factors.

In one or more implementations, failure authentication credentials may be automatically associated with a received fingerprint specifically if validation of received authentication information fails. In such an implementation, if a user provides authentication information that is invalid, the computer device may subsequently capture the fingerprint of the user who has provided the invalid authentication information, associate the fingerprint with potential fraud and/or other unauthorized use, and/or transmit such a fingerprint and/or status to one or more other computers to alert a service provider, an authorized user, and/or other such parties of potential fraudulent and/or unauthorized use of the computing device. In this way, the identity of a potential fraudulent and/or unauthorized user of the computing device may be tracked and/or utilized to identify the perpetrator of such fraudulent and/or unauthorized use.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
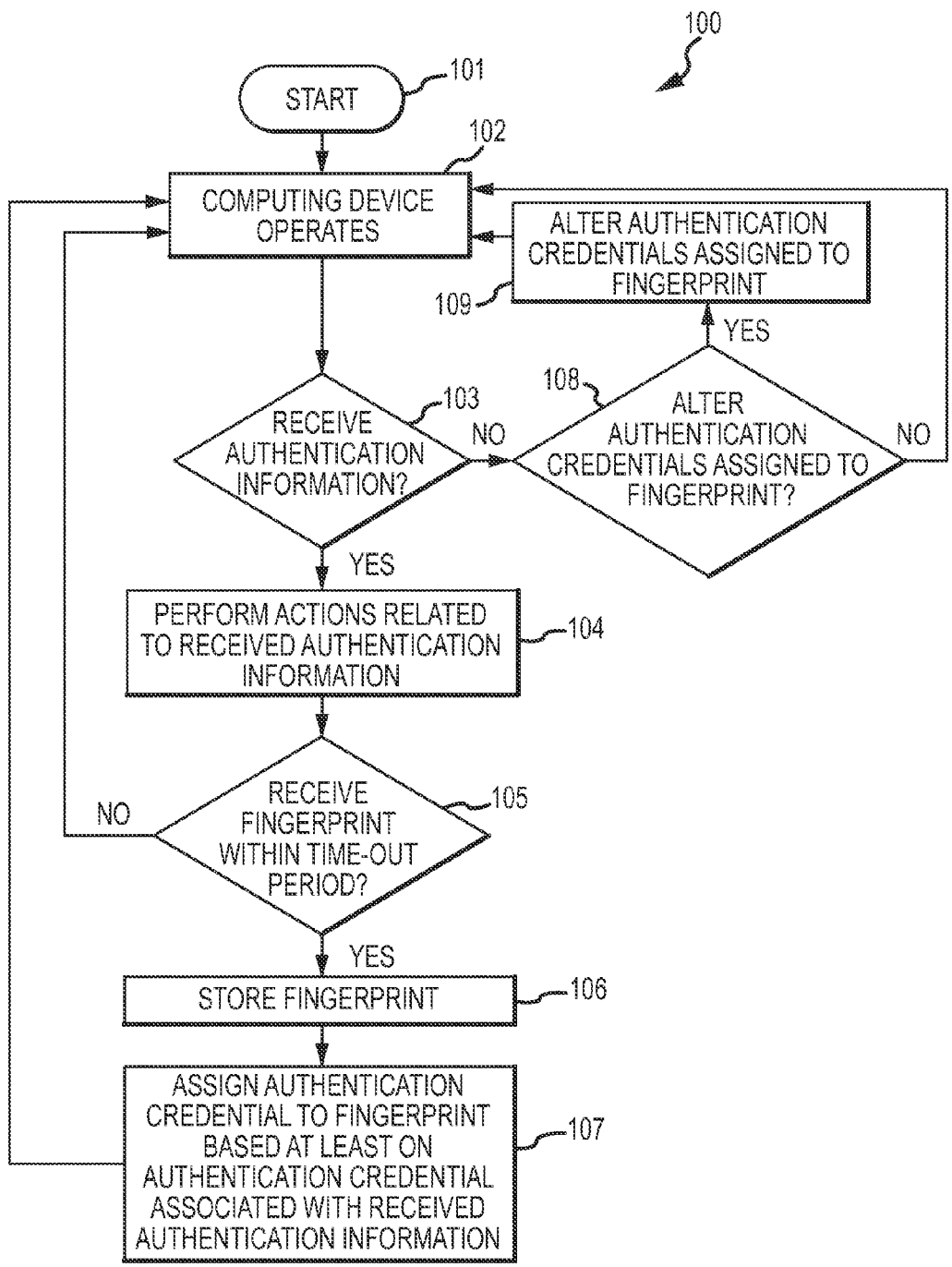
FIG. 1 is a flow illustrating a method for automatic association of authentication credentials with biometrics.

The description that follows includes sample systems, methods, and computer program products that embody various elements of the present disclosure. Embodiments described herein may be configured to operate with a variety of sensors, including strip or swipe sensors, array or other two-dimensional sensors, and the like. However, it should be understood that the described disclosure may be practiced in a variety of forms in addition to those described herein.

The present disclosure discloses systems and methods for automatic association of authentication credentials with biometrics. A computing device may receive authentication information from a user, such as one or more passwords or pin codes. Within a time-out period from receipt of the authentication information, the computing device may receive one or more biometrics from the user. Such biometrics may include one or more fingerprints of the user received via one or more touch I/O devices associated with the computing device. The computing device may store the one or more biometrics and/or assign one or more authentication credentials (i.e., user rights) to the one or more biometrics based at least on the authentication credentials associated with previously received authentication information. In this way, authentication credentials may be automatically associated with user biometrics without requiring users to participate in any potentially burdensome enrollment processes.

In some implementations, the computing device may assign the same authentication credentials to the biometric as those that are associated with the received authentication information. However, in other implementations, the computing device may assign different authentication credentials to the biometric from those that are associated with the received authentication information. Such different authentication credentials may be a subset of the authentication credentials associated with the received authentication information, a superset of the authentication credentials associated with the received authentication information, and so on. In cases where the computing device assigns different authentication credentials to the biometric from those associated with the received authentication information, the difference between the authentication credentials associated with the biometric and the received authentication information may be determined based on one or more user preferences, defaults, security policies, enterprise policies (when the computing device is utilized in an enterprise computing arrangement), and so on.

In various implementations, after authentication credentials have been assigned to the biometric, the assigned authentication credentials may be altered. In some cases, user rights associated with the authentication credentials may be removed, added, and so on. Such alteration may be performed in response to user indications to alter authentication credentials, enterprise policy changes pushed to the computing device, changes in security policies, fraud alerts associated with the user and/or the computing device, and/or other such factors.

FIG. 1 illustrates a method 100 for automatic association of authentication credentials with biometrics. The flow begins at block 101 and proceeds to block 102 where the computing device operates. The flow then proceeds to block 103 where the computing device may determine whether or not authentication information (such as one or more passwords, pin codes, and/or other such authentication information) for a user is received. If so, the flow proceeds to block 104. Otherwise, the flow returns to block 102 where the computing device continues to operate.

At block 104, after the computing device determines that authentication information is received, the computing device may perform one or more actions related to the received authentication information. Such actions may include one or more of validating the authentication information, determining whether the authentication information is associated with authentication credentials that allow performance of one or more functions that are related to the providing of the authentication information, execution of one or more functions that are related to the providing of the authentication information if the authentication information is validated and associated with appropriate authentication credentials, denial of execution of one or more functions that are related to the providing of the authentication information if the authentication information is not validated or associated with appropriate authentication credentials (and/or presentation of related error messages), and so on.

In some cases, the computing device may include stored information for validating such authentication information and/or determining authentication credentials associated with the authentication information. In such cases, the computing device may perform such validation and/or determination operations. However, in other cases, information for validating such authentication information and/or determining authentication credentials associated with the authentication information may be stored by one or more other computing devices with which the computing device communicates. In such cases, the computing device may transmit the authentication information to such other computing devices and may receive one or more indications as to whether such authentication information is valid and/or what authentication credentials are associated with the authentication information.

The flow may then proceeds to block 105 where the computing device may determine whether or not one or more fingerprints are received from the user (such as via one or more touch I/O devices associated with the computing device) within a time-out period (such as five minutes) of receipt of the authentication information. If so, the flow proceeds to block 106. Otherwise, the flow returns to block 102 where the computing device continues to operate.

At block 106, after the computing device determines that a fingerprint is received from the user within the time-out period, the computing device may store the received fingerprint (and/or information related to the received fingerprint such as one or more representations of the fingerprint, data regarding one or more representations of the fingerprint, and so on). The flow may then proceed to block 107 where the computing device assigns one or more authentication credentials to the fingerprint based at least on one or more authentication credentials associated with the received authentication information. Subsequently, the user may provide the fingerprint to the computing device (such as via the touch I/O device) in order to provide proof of the associated authentication credentials.

The computing device may assign the same authentication credentials to the biometric as those that are associated with the received authentication information or authentication credentials that are different from those associated with the received authentication information. Such different authentication credentials may be a subset of the authentication credentials associated with the received authentication information (such as where the fingerprint is to be associated with less authentication credentials than the received authentication information) or a superset of the authentication credentials associated with the received authentication information (such as where the fingerprint is to be associated with more authentication credentials than the received authentication information). In cases where the computing device assigns assign different authentication credentials, the difference may be determined based on one or more user preferences, defaults, security policies, enterprise policies (when the computing device is utilized in an enterprise computing arrangement), and so on.

After the computing device assigns one or more authentication credentials to the fingerprint, the flow may return to block 102 where the computing device continues to operate.

At block 108, after the computing device determines that authentication information is received, the computing device may determine whether or not to alter one or more authentication credentials that have been assigned to one or more fingerprints. Such alteration may include removing one or more authentication credentials assigned to a fingerprint and/or adding one or more authentication credentials assigned to a fingerprint. The computing device may make such a determination based at least on one or more requests received from a user, changes to one or more default or user preferences, changes to one or more security policies and/or enterprise policies that have been pushed to the computing device, and so on. If the computing device determines to alter one or more authentication credentials that have been assigned to one or more fingerprints, the flow proceeds to block 109. Otherwise, the flow returns to block 102 where the computing device continues to operate.

At block 109, after the computing device determines to alter one or more authentication credentials that have been assigned to one or more fingerprints, the computing device alters the authentication credentials assigned to the one or more fingerprints accordingly. The flow then returns to block 102 where the computing device continues to operate.

Although the method 100 is illustrated and described above as including particular operations performed in a particular order, it is understood that this is for the purposes of example. Other arrangements, which may include fewer and/or additional operations, are contemplated and are possible without departing from the scope of the present disclosure.

For example, the method 100 is illustrated and described as storing the fingerprint at block 106. However, in various situations, the computing device (and/or one or more other computing devices with which the computing device communicates) may already store the fingerprint. In such situations the computing device may recognize that the received fingerprint is already stored and assign one or more authentication credentials to the already stored fingerprint without storing a new copy of information related to the received fingerprint.

Figure 2:
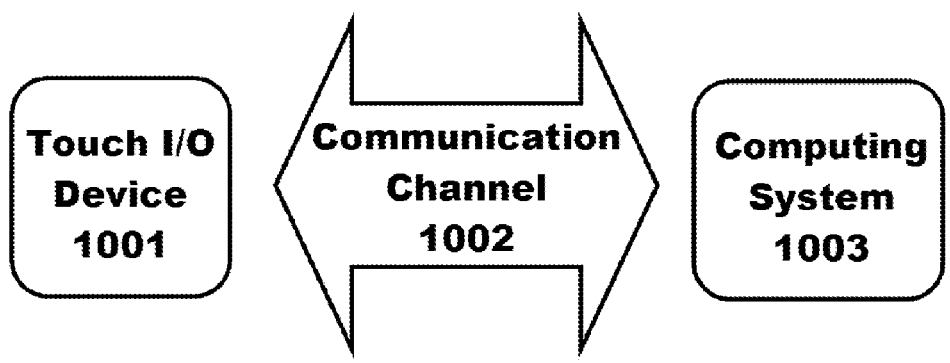
FIG. 2 is a block diagram illustrating a touch I/O device that can receive touch input for interacting with a computer system. The computer system may perform the method of FIG. 1.

Described embodiments may include touch I/O device 1001 that can receive touch input for interacting with computing system 1003 (FIG. 2) via wired or wireless communication channel 1002. The computing system 1003 may be configured to perform the method 100 of FIG. 1. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

In various implementations, one or more fingerprint sensors may be incorporated into the touch I/O device 1001, located underneath the touch I/O device 1001, incorporated into one or more other touch I/O devices (which may be different types of touch I/O device than the touch I/O device 1001), and so on.

Figure 3:
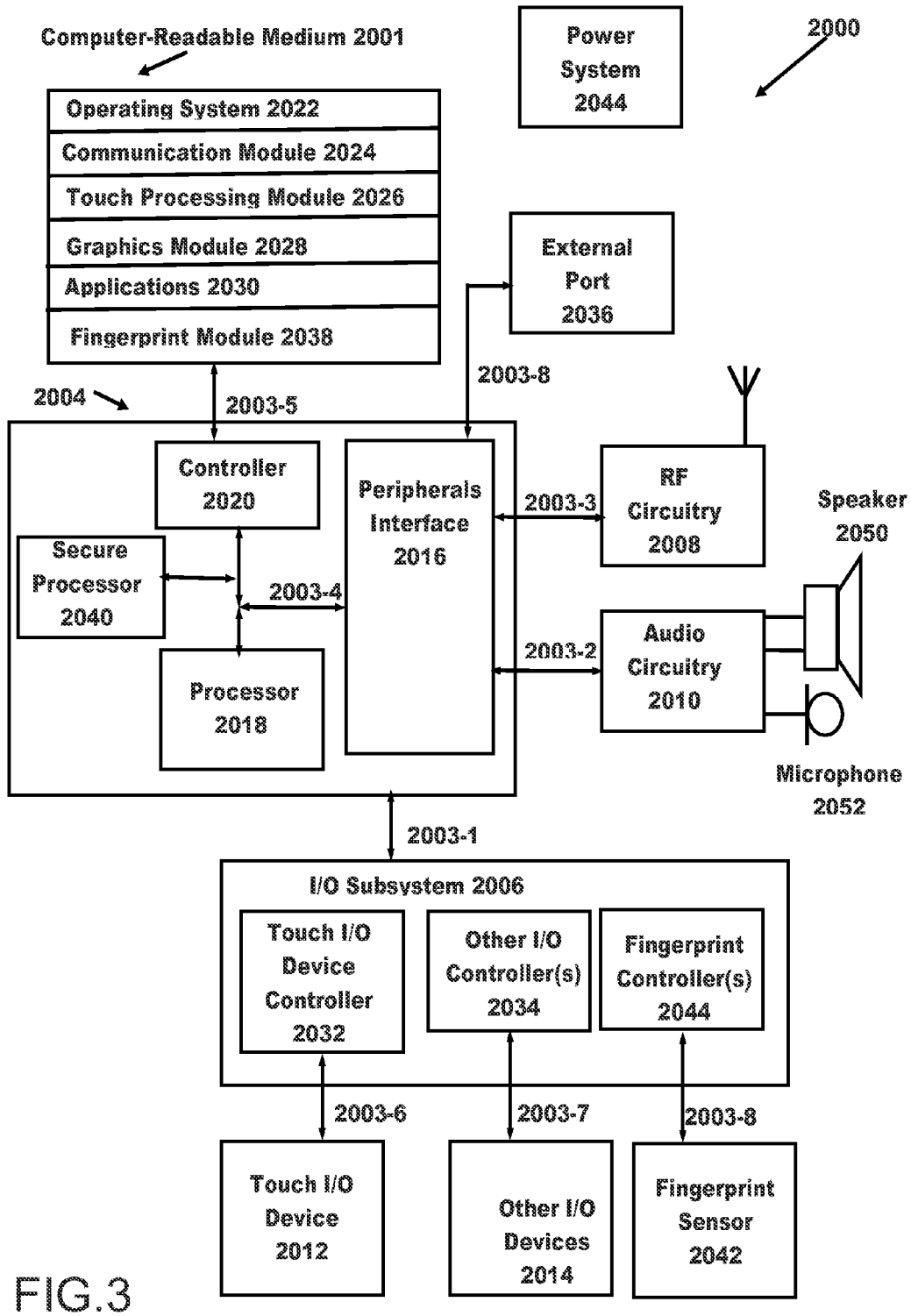
FIG. 3 is a block diagram illustrating computer system that includes a touch I/O device that can receive touch input for interacting with the computer system. The computer system may perform the method of FIG. 1.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 3 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations. The system may be configured to perform the method 100 of FIG. 1.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIG. 1. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The secure processor 2040 may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

With reference to FIG. 1, aspects of example automatic association of authentication credentials with biometrics implementations will now be described in specific detail. As discussed above, in some cases, the computing device may assign different authentication credentials to the fingerprint than those assigned to the received authentication information.

In some cases one or more one or more user preferences, defaults, security policies, enterprise policies, or other such factors may specify that fingerprints are to be assigned less authentication credentials than received authentication information. For example, the authentication information may be a pin code that the user enters in order to purchase digital content products (such as one or more image files, music files, movie files, and so on) via an online digital content product purchasing service. The user may be able to order any digital content products using the online digital content product purchasing service utilizing the pin code. However, a security policy related to the online digital content product purchasing service may specify that fingerprints are not to be treated as being as reliable as the pin code. As such, when authentication credentials are assigned to the fingerprint, the computing device may only assign authentication credentials to the fingerprint allowing the user to provide the fingerprint for purchasing digital content products via the online digital content product purchasing service up to a particular amount (such as $100). In such a case, the user may subsequently be able to purchase up to $100 worth of content by providing the fingerprint but may still have to provide the pin code to purchase more than $100 worth of content.

In other cases one or more one or more user preferences, defaults, security policies, enterprise policies, or other such factors may specify that fingerprints are to be assigned more authentication credentials than received authentication information. For example, the authentication information may be a password that the user enters in order to make configuration changes to the computing device. Based on enterprise policies of an enterprise system in which the computing device is used, the user may be able to enter the password in order to change existing software of the computing device but may not be able to do so in order to install new software. However, enterprise policies for the enterprise system in which the computing device is used may determine that fingerprints are more reliable than passwords as passwords may be guessed. As such, when authentication credentials are assigned to the fingerprint, the computing device may assign authentication credentials to the fingerprint allowing the user to change existing software of the computing device as well as installing new software as the computing device may be more certain that the user is actually then user when providing the fingerprint.

In still other cases, the computing device may alter authentication credentials associated with the authentication information when the fingerprint is received. For example, a security policy of the computing device may allow a user to provide a password in order to make changes to an existing communication account (such as a data provider plan account) associated with the computing device, but not order new communication account services directly through the computing device. In order to order new communication account services, the user may have to contact a representative of the communication account provider. However, after the user has provided a fingerprint after providing the password (resulting in authentication credentials being assigned to the fingerprint), the security policy may determine that the computing device can be more certain of the user's identity. As such, the security policy may specify for the computing device to update the authentication credentials associated with the password to allow the user to order new communication account services directly through the computing device upon providing the password (and/or assigning similar authentication credentials to the fingerprint).

As also discussed above, in some cases, the computing device may alter authentication credentials that have been assigned to one or more fingerprints. As discussed above, such alteration may include removing authentication credentials, adding authentication credentials, and so on and may be based at least on user requests, changes to defaults or user preferences, changes to security and/or enterprise policies, and/or other such factors.

In some cases, an enterprise system in which the user utilizes the computing device may have an enterprise policy specifying that computing devices should assign authentication credentials mirroring passwords when using processes similar to method 100 to automatically associate authentication credentials with fingerprints. However, after a computing device assigns such authentication credentials to a user's fingerprint the enterprise policy may be changed (such that authentication credentials assigned to fingerprints in such a manner should allow less access than providing a password. As part of the change to the enterprise policy, the enterprise system may push the policy change to various computing devices, including the computing device. In response to receiving the pushed policy change, the computing device may remove authentication credentials assigned to the fingerprint in accordance with specifications included in the enterprise policy.

For example, an enterprise system may have an enterprise policy specifying to assign authentication credentials mirroring passwords for accessing email clients (which allow users to access email clients whether the computing device is being used with an enterprise communication network or a non-enterprise communication network) when automatically associate authentication credentials with fingerprints. However, after a computing device assigns such authentication credentials to a user's fingerprint, the enterprise policy may be changed in response to a number of incidents of forged fingerprints (such as if a simple method of forging fingerprints was discovered and commonly exploited).

The change to the enterprise policy may specify that fingerprints can be used to access email clients only when the computing device is used with an enterprise communication network, not a non-enterprise communication network. As such, when the enterprise policy is pushed to the computing device, the computing device may remove authentication credentials associated with the fingerprint that relate to the ability to access email clients from non-enterprise communication networks. Thus, a user may still be able to use email clients from non-enterprise communication networks by providing a password, but may only be able to access the email client from enterprise communication networks by providing the fingerprint.

In some implementations, the authentication information received from a user may be validated before authentication credentials associated with the authentication information is automatically associated with a subsequently received fingerprint. However, in other cases such validation may not be performed before authentication credentials associated with the authentication information is automatically associated with a subsequently received fingerprint.

In some cases, authentication credentials associated with received authentication information may be automatically associated with a subsequently received fingerprint specifically if validation of the received authentication information fails. For example, a smart phone may be configured to require a password in order to use the phone. If an incorrect password is provided, the phone may be configured to capture a fingerprint from a touch I/O device of the phone within a certain time window (such as such as a few seconds as part of a unified gesture/action gather and validate a biometric) of the receipt of the incorrect password. The phone may then store the fingerprint and associate the fingerprint with failed authentication credentials (which correspond to no user rights). In this way, the phone may enable tracking of unauthorized users of the phone by storing fingerprints of users who provide incorrect passwords.

In some cases, the phone may not just store the fingerprint and indication that the user associated with the fingerprint provided an incorrect password. In some cases the phone may perform a variety of other actions, such as transmitting the fingerprint and associated password failure (and/or other data, such as a picture of the user who provided the fingerprint taken by a camera or other image capture device associated with the phone) to one or more other computers (such as a phone network server computer) which may then store the fingerprint and associated password failure, providing one or more alerts regarding the failed password (such as to one or more servers, one or more email addresses associated with an authorized user of the phone, and so on), and/or other such actions. These actions may enable the authorized user or other party (such as a service provider associated with the phone) to monitor, track, and identify, a party who may be attempting to utilize the phone without authorization (such as a thief who has stolen the phone, the authorized user's child, and so on).

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for automatic association of authentication credentials with biometrics, the method comprising:
   receiving authentication information from at least one user utilizing at least one processing unit;
   within a time-out period from receipt of the authentication information, receiving at least one fingerprint from the at least one user utilizing the at least one processing unit via a fingerprint sensor disposed below a touch sensitive surface of at least one touch input/output (I/O) device, wherein the at least one fingerprint is received while the touch sensitive surface receives one or more touch inputs from the at least one user; and
   assigning at least one authentication credential to the at least one fingerprint, utilizing the at least one processing unit, based at least on at least one authentication credential associated with the authentication information.

2. The method of claim 1, wherein the authentication information comprises invalid authentication information and at least one authentication credential assigned to the at least one fingerprint comprises at least one invalid authentication indication, further comprising:
   transmitting the at least one fingerprint and the at least one invalid authentication indication from the at least one processing unit to at least one server computing device.

3. The method of claim 1, further comprising altering the at least one authentication credential assigned to the at least one fingerprint utilizing the at least one processing unit.

4. The method of claim 3, wherein said operation of altering the at least one authentication credential assigned to the at least one fingerprint utilizing the at least one processing unit further comprises adding at least one authentication credential or removing the at least one authentication credential.

5. The method of claim 3, wherein said operation of altering the at least one authentication credential assigned to the at least one fingerprint utilizing the at least one processing unit is performed in response to at least one enterprise system policy pushed to a computing device that incorporates the at least one processing unit by at least one enterprise system server.

6. The method of claim 1, wherein the at least one authentication credential assigned to the at least one fingerprint includes at least one authentication credential that is not associated with the authentication information.

7. The method of claim 1, wherein the at least one authentication credential assigned to the at least one fingerprint is a subset of authentication credentials associated with the authentication information.

8. The method of claim 7, wherein the subset of the authentication credentials associated with the authentication information is selected based at least on at least one default, user preference, security policy, or enterprise system policy.

9. The method of claim 1, wherein the at least one authentication credential assigned to the at least one fingerprint is identical to the at least one authentication credential associated with the authentication information.

10. A system for automatic association of authentication credentials with biometrics, comprising:
at least one processing unit;
at least one touch input/output (I/O) device coupled to the at least one processing unit, wherein the at least one touch I/O device includes a fingerprint sensor disposed below a touch sensitive surface, the touch sensitive surface configured to receive touch inputs for the system; and
at least one non-transitory storage medium storing instructions executable by the at least one processing unit to:
receive authentication information from at least one user;
within a time-out period from receipt of the authentication information, receive at least one fingerprint from the at least one user via the touch sensitive surface while the touch sensitive surface receives one or more touch inputs from the at least one user; and
assign at least one authentication credential to the at least one fingerprint based at least on at least one authentication credential associated with the authentication information.

11. The system of claim 10, wherein the at least one authentication credential assigned to the at least one fingerprint is identical to the at least one authentication credential associated with the authentication information.

12. The system of claim 10, wherein the at least one authentication credential assigned to the at least one fingerprint is a subset of authentication credentials associated with the authentication information.

13. The system of claim 12, wherein the at least one processing unit selects the subset of the authentication credentials associated with the authentication information based at least on at least one default, user preference, security policy, or enterprise system policy.

14. The system of claim 10, wherein the at least one authentication credential assigned to the at least one fingerprint includes at least one authentication credential that is not associated with the authentication information.

15. The system of claim 10, wherein the at least one non-transitory storage medium further stores instructions executable by the at least one processing unit to alter the at least one authentication credential assigned to the at least one fingerprint.

16. The system of claim 15, wherein said alteration of the at least one authentication credential assigned to the at least one fingerprint further comprises adding at least one authentication credential or removing the at least one authentication credential.

17. The system of claim 15, wherein the at least one processing unit alters the at least one authentication credential assigned to the at least one fingerprint in response to at least one enterprise system policy pushed to a computing device that incorporates the at least one processing unit by at least one enterprise system server.

18. The system of claim 10, wherein the authentication information comprises invalid authentication information and at least one authentication credential assigned to the at least one fingerprint comprises at least one invalid authentication indication.

19. The system of claim 18, wherein the at least one processing unit transmits the at least one fingerprint and the at least one invalid authentication indication to at least one server computing device.

20. A computer program product comprising:
a first set of instructions, stored in at least one non-transitory machine readable medium, executable by at least one processing unit to receive authentication information from at least one user;
a second set of instructions, stored in the at least one non-transitory machine readable medium, executable by the at least one processing unit to within a time-out period from receipt of the authentication information, receive at least one fingerprint from the at least one user via a fingerprint sensor disposed below a touch sensitive surface of at least one touch input/output (I/O) device, wherein the at least one fingerprint is received while the touch sensitive surface receives one or more touch inputs from the at least one user; and
a third set of instructions, stored in the at least one non-transitory machine readable medium, executable by the at least one processing unit to assign at least one authentication credential to the at least one fingerprint based at least on at least one authentication credential associated with the authentication information.

* * * * *